(12) United States Patent
Cheron et al.

(10) Patent No.: US 6,517,146 B1
(45) Date of Patent: Feb. 11, 2003

(54) ATTACHMENT OF FRONT QUADRANT TO CROSSMEMBER

(75) Inventors: Hugues Cheron, Bourg Saint Christophe (FR); Laurent Decker, Boulogne Billancourt (FR); Bruno Ghiringhelli, Langres (FR); Alain Liadouze, Buc (FR); Marc Durbize, Jouars-Pont-de-Chartrain (FR)

(73) Assignees: Compagnie Plastic Omnium, Lyons (FR); Renault SA, Boulogne Billancourt (FR)

( * ) Notice: Subject to any disclaimer, the term of this patent is extended or adjusted under 35 U.S.C. 154(b) by 0 days.

(21) Appl. No.: 09/711,097

(22) Filed: Nov. 14, 2000

(30) Foreign Application Priority Data

Nov. 15, 1999 (FR) .............................. 99 14279

(51) Int. Cl.⁷ .......................... B60K 11/04; B60R 27/00
(52) U.S. Cl. .................. 296/194; 296/203.02; 180/68.4
(58) Field of Search ............................ 296/194, 203.02; 180/68.4

(56) References Cited

U.S. PATENT DOCUMENTS

| | | | | |
|---|---|---|---|---|
| 4,597,603 A | * | 7/1986 | Trabert ........................ 296/194 |
| 4,940,281 A | * | 7/1990 | Komatsu ..................... 296/194 |
| 5,303,973 A | * | 4/1994 | Fujii .......................... 296/194 |
| 5,409,288 A | | 4/1995 | Masuda |
| 5,549,350 A | * | 8/1996 | Akiyama et al. ............ 296/204 |
| 5,752,718 A | * | 5/1998 | Schnabel et al. ............. 296/72 |
| 6,038,740 A | * | 3/2000 | Hoger et al. .............. 296/146.9 |
| 6,186,583 B1 | * | 2/2001 | Martin ....................... 296/194 |
| 6,189,958 B1 | * | 2/2001 | Guyomard et al. ......... 296/194 |
| 6,196,624 B1 | * | 3/2001 | Bierjon et al. .............. 296/194 |
| 2001/0020796 A1 | * | 9/2001 | Delavalle et al. ........... 296/197 |

FOREIGN PATENT DOCUMENTS

| | | | |
|---|---|---|---|
| DE | 43 07 793 A1 | 9/1994 | |
| DE | 195 20 870 A1 | 12/1996 | |
| EP | 0 437 781 A2 | 7/1991 | |
| EP | 0 652 150 A1 | 5/1995 | |
| EP | 0 679 565 A1 | 11/1995 | |
| FR | 2625164 A1 * | 6/1989 | ................. 296/194 |
| FR | 2708554 A1 * | 2/1995 | ................. 296/194 |
| FR | 2 754 235 A | 4/1998 | |
| JP | 07-285460 A | 10/1995 | |
| JP | 10-264858 A | 10/1998 | |
| WO | WO 82/00808 A | 3/1982 | |
| WO | WO 99/54187 A | 10/1999 | |

* cited by examiner

*Primary Examiner*—D. Glenn Dayoan
*Assistant Examiner*—H. Gutman
(74) *Attorney, Agent, or Firm*—Oliff & Berridge, PLC

(57) ABSTRACT

Motor vehicle functional front end comprising at least one upper crossmember (2) and, at each end of the upper crossmember, a support piece (3) capable of supporting at least one lighting unit of the vehicle, characterized in that the connection between the upper crossmember and each support piece is provided by one nesting into the other, combined with a possibility of adjustment in a roughly horizontal direction perpendicular to the axis of the vehicle.

7 Claims, 2 Drawing Sheets

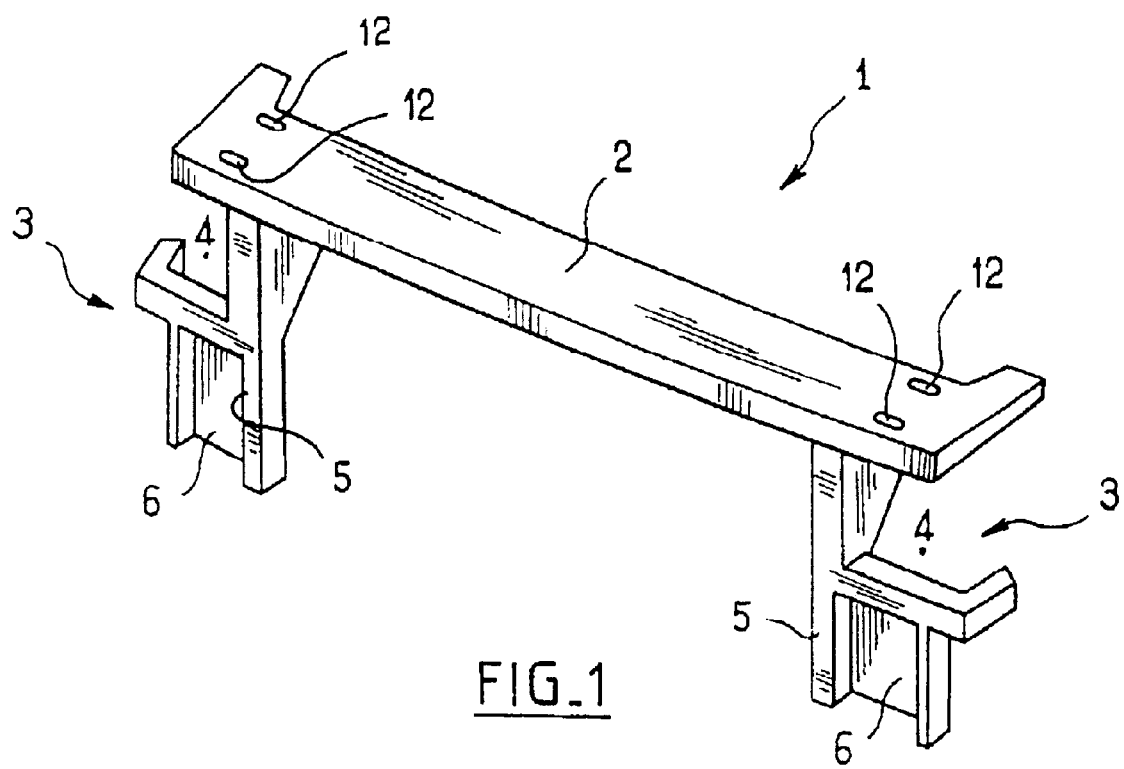
FIG_1
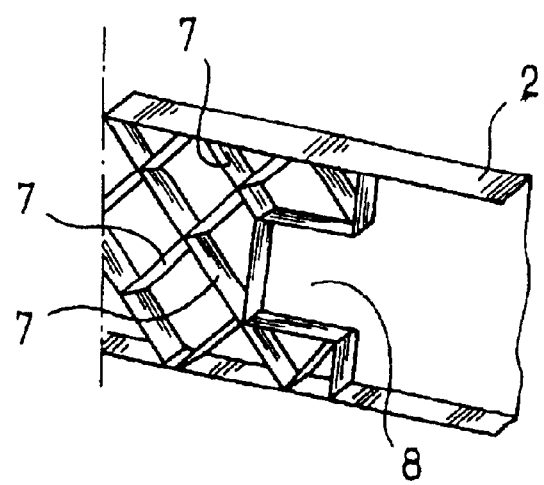
FIG_2

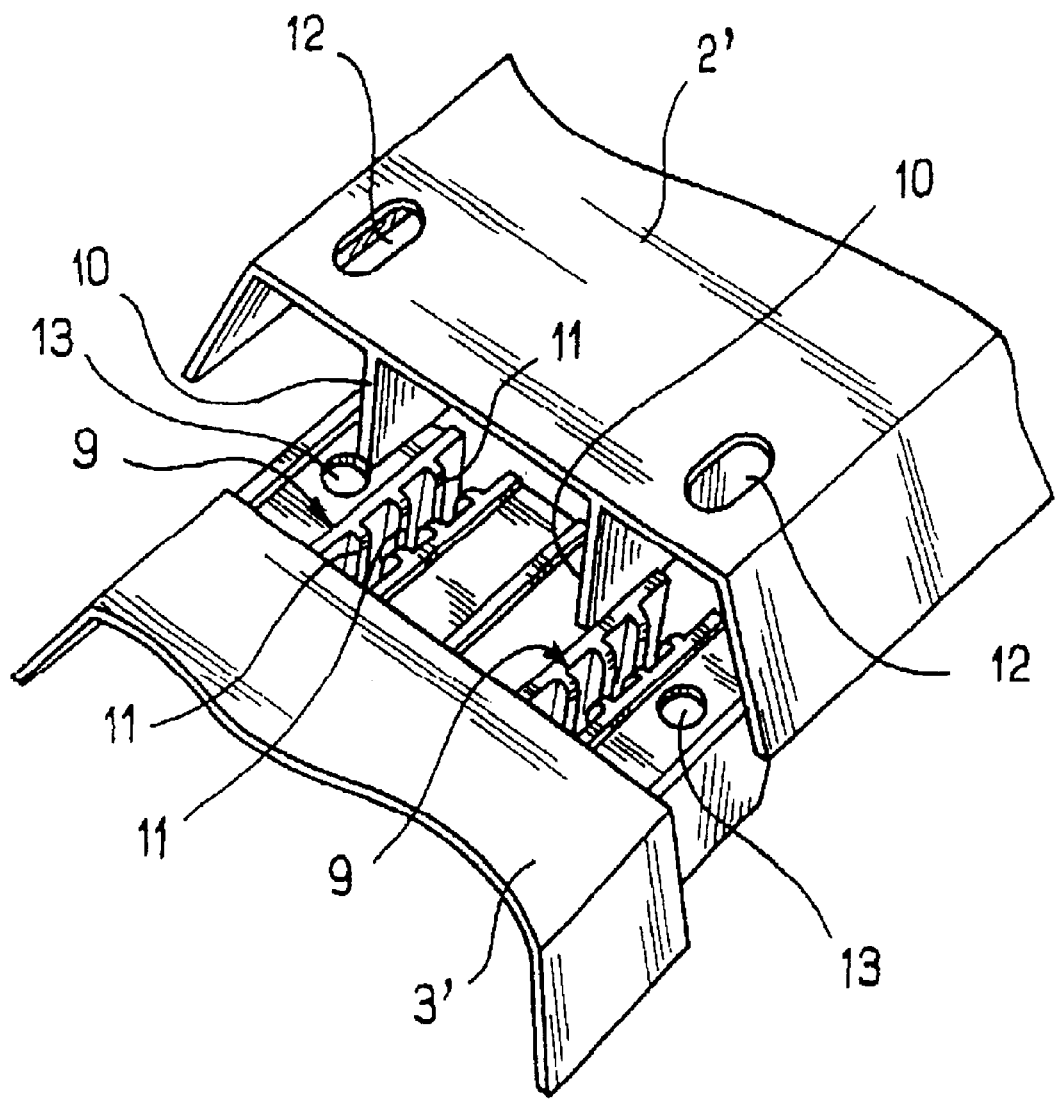
FIG_3

ATTACHMENT OF FRONT QUADRANT TO CROSSMEMBER

BACKGROUND OF THE INVENTION

1. Field of the Invention

The present invention relates to a motor vehicle functional front end with a modular structure.

2. Description of Related Art

Motor vehicle functional front ends are known and are structures placed at the front of the vehicles and used to support the radiator and various other items arranged around the radiator.

These functional front ends are positioned directly on the vehicle chassis and are generally satisfactory in their traditional role of supporting technical items, particularly allowing the assembly operations on the vehicle assembly line to be made easier because they can be pre-equipped away from the assembly line before being installed on the vehicle.

By contrast, conventional functional front ends cannot be used to support items of bodywork or lighting units which have to be positioned appropriately with respect to the remainder of the vehicle bodywork.

SUMMARY OF THE INVENTION

The present invention aims to provide a motor vehicle functional front end which, in addition to its conventional functions of supporting technical items, is capable of supporting pieces of bodywork or lighting units positioned appropriately with respect to the remainder of the vehicle bodywork.

BRIEF DESCRIPTION OF THE DRAWINGS

With a view to making the invention easier to understand, one embodiment thereof, given by way of non-limiting example, will now be described with reference to the appended drawing in which:

FIG. 1 is a perspective view of a functional front end according to the invention, FIG. 2 is a view from below of part of the upper crossmember of FIG. 1, FIG. 3 is a close-up view of part of the upper crossmember and of part of the support piece, both viewed from above, prior to their assembly, according to an alternative form of embodiment.

DETAILED DESCRIPTION OF PREFERRED EMBODIMENTS

The subject of the present invention is a motor vehicle functional front end comprising at least one upper crossmember and, at each end of the upper crossmember, a support piece capable of supporting at least one lighting unit of the vehicle, characterized in that the connection between the upper crossmember and each support piece is provided by one nesting into the other, combined with a possibility of adjustment in a roughly horizontal direction perpendicular to the longitudinal axis of the vehicle.

This adjustment makes it possible to compensate for manufacturing tolerances both on the vehicle body and on the functional front end so that the latter is in register with the remainder of the bodywork, something which is very important if the functional front end supports lighting units or pieces of bodywork which have to be in a very precise position with respect to the remainder of the bodywork, such as a skirt or spoiler for example.

Specifically, the functional front end according to the invention can be precisely adjusted widthwise in order to suit the distance separating, in particular, the fenders of the vehicle, so that the lighting units supported by the support pieces of the front end are positioned appropriately with respect to the fenders of the vehicle.

The same is true of any spoiler or skirt which has to come flush with the front edges of the wings of the vehicle.

In addition to its ability to be adjusted, the connection between the crossmember and each support piece is a nesting connection capable of withstanding the mechanical stresses resulting, in particular, from the slamming of the hood, the forces of tearing and deformation experienced in the event of an impact, or forces from the body when imparting through the body and which generate relative displacements of the parts one with respect to the other, and noise.

In one particular embodiment of the invention, the adjustable nesting is also demountable, and this affords two advantages:

First of all, the demountable nature of the nesting fit is advantageous for mounting the functional front end on the vehicle because the two support pieces can be pre-assembled on the crossmember without precise adjustment, then their position on the crossmember can be adjusted either on a jig or directly upon mounting on the vehicle, using the play offered by the adjustment of the nesting fit, after which the support pieces can be firmly secured to the crossmember, giving the functional front end a tailor-made geometry specific to the vehicle in question.

In addition, by virtue of the possibility of demounting the connection, the vehicle becomes easier to repair and its cost is reduced because, following an impact, damage generally extends to just one support piece which can be replaced by virtue of the invention, in most cases keeping the other support piece and the upper crossmember.

In one particular embodiment of the invention, each support piece is a front quadrant within the meaning of the French patent by the applicant company published under the No. 2 754 235.

This front quadrant comprises internal housings to accommodate the lighting unit and other items of the vehicle such as the indicators, the screen washers, the electrical or electronic units, the washer fluid bottle, etc.

In one particular embodiment, nesting means comprise ribs provided under the crossmember.

These ribs may be obtained by overmoulding a metal section piece which constitutes the metal core of the crossmember.

On the support piece side, there are slots to accommodate the ribs.

These slots are advantageously fitted with opposed teeth projecting from the walls of the slots. These teeth grip the ribs of the crossmember to provide a good quality fit and sufficient mechanical continuity between the upper crossmember and the support pieces.

This mechanical continuity is particularly advantageous when the support pieces are secured by their lower end to the side frames of the vehicle because, in this case, the rigidity of the side frames can be transmitted by the support pieces to the upper crossmember via the aforementioned nesting fit, which stiffens the entire functional front end.

In one particular embodiment of the invention, fixing orifices are formed in the crossmember and on each support piece to allow the support pieces to be pre-assembled and definitively attached to the crossmember. The orifices in the crossmember are preferably oblong, which constitutes the means of adjustment to compensate for the manufacturing tolerances.

The functional front end 1 depicted in the drawing comprises an upper crossmember 2 and two lateral support pieces 3 which are also known as front quadrants.

Each front quadrant 3 comprises a housing 4 to accommodate a lighting unit of the vehicle and various other housings 5, 6 to accommodate items conventionally housed in the engine compartment of the vehicle, namely a washer fluid bottle, a washer fluid nozzle, indicators, etc.

The connection between the upper crossmember 2 and each front quadrant 3 is made by nesting by virtue of a specific geometry of the upper crossmember, which geometry is best visible in FIGS. 2 and 3.

In the example depicted, the upper crossmember 2 is a metal section piece with a U-shaped cross section with ribs 7 in its downward-facing convex part.

At each front quadrant, these ribs 7 define a housing 8 capable of accommodating a corresponding part of the front quadrant by nesting with the ribs of the upper crossmember, the nesting nonetheless being combined with a possibility for adjustment longitudinally to the crossmember, that is to say, with respect to the vehicle, in an essentially horizontal direction perpendicular to the direction of travel of the vehicle.

In the alternative form of FIG. 3, the upper part of the front quadrant 3' has slots 9 to accommodate the ribs 10 of the upper crossmember 2', these slots being equipped with opposed teeth 11 projecting from the walls of the slots 9.

The function of the opposed teeth 11 is to grip the ribs 10 of the crossmember to provide an optimum nesting fit and sufficient mechanical continuity between the upper crossmember and the front quadrants.

The upper crossmember 2, 2' is equipped with two oblong holes 12 which are in register with some tapped circular orifices 13 in the front quadrant, when the latter is fitted-together with the crossmember.

Fixing screws (not depicted), engaged in the oblong holes 12 and in the tapped orifices 13 of the front quadrant, secure the front quadrants to the upper crossmember.

The oblong holes allow the position of the front quadrants to be adjusted with respect to the crossmember, in accordance with the invention.

This adjustment may be performed on the vehicle when mounting the functional front end, or on a jig, assuming that the functional front end is to be pre-adjusted and mounted as it is on the vehicle.

It is to be clearly understood that the embodiment which has just been described does not exhibit any limiting nature and that it can be modified in any desirable way without thereby departing from the scope of the invention.

What is claimed is:

1. Motor vehicle functional front end comprising
   an upper crossmember having a first end and a second end;
   a first support piece located at the first end of the upper crossmember;
   a second support piece located at the second end of the upper crossmember, wherein the first support piece and the second support piece are each capable of supporting at least one lighting unit of a vehicle; and
   a nesting means at each of the first end and the second end of the upper crossmember and on each of the first support piece and the second support piece, the nesting means fixing the crossmember onto the first support piece and the second support piece before the first support piece and the second support piece are definitively attached to the crossmember, wherein the fixing allows the distance between the first support piece and the second support piece to be suitably adjusted.

2. Motor vehicle functional front end comprising
   an upper crossmember having a first end and a second end;
   a first support piece located at the first end of the upper crossmember;
   a second support piece located at the second end of the upper crossmember, wherein the first support piece and the second support piece are each capable of supporting at least one lighting unit of a vehicle; and
   ribs on the upper crossmember and slots on each of the first support piece and the second support piece, the slots accommodating the ribs, the slots and the ribs fixing the upper crossmember onto the first support piece and the second support piece before the first support piece and the second support piece are definitively attached to the upper crossmember, wherein the fixing allows the distance between the first support piece and the second support piece to be suitably adjusted.

3. The motor vehicle functional front end according to claim 2, wherein the first support piece and the second support piece are front quadrants.

4. The motor vehicle functional front end according to claim 2, wherein the ribs comprise an over-molded metal section piece of the upper crossmember having a metal core.

5. The motor vehicle functional front end according to claim 2, wherein the slots of the first support piece and the second support piece comprise walls fitted with opposed teeth projecting from the walls, wherein the opposed teeth grip the ribs of the upper crossmember providing a strong fit and sufficient continuity between the upper crossmember and the first support piece and between the upper crossmember and the second support piece.

6. The motor vehicle functional front end according to claim 2, wherein attachment orifices are formed in the upper crossmember and on each of the first support piece and the second support piece.

7. The motor vehicle functional front end according to claim 6, wherein the attachment orifices formed in the upper crossmember are oblong.

* * * * *

UNITED STATES PATENT AND TRADEMARK OFFICE
CERTIFICATE OF CORRECTION

PATENT NO.    : 6,517,146 B1
DATED         : February 11, 2003
INVENTOR(S)   : Hugues Cheron et al.

It is certified that error appears in the above-identified patent and that said Letters Patent is hereby corrected as shown below:

<u>Title page,</u>
Item [73], Assignees, the city of the assignee, "Compagnie Plastic Omnium", should be -- Lyon (FR) --.

Signed and Sealed this

Twenty-ninth Day of July, 2003

JAMES E. ROGAN
*Director of the United States Patent and Trademark Office*